United States Patent

[11] 3,633,949

| [72] | Inventor | Helmut Pfluger<br>Hockdorf-Ziegelhof, Finkenweg, Germany |
|---|---|---|
| [21] | Appl. No. | 838,298 |
| [22] | Filed | July 1, 1969 |
| [45] | Patented | Jan. 11, 1972 |
| [73] | Assignee | Firma Traub GmbH<br>Reichenbach (Fils), Germany |
| [32] | Priority | July 20, 1968 |
| [33] | | Germany |
| [31] | | P 17 75 261.3 |

[54] DEVICE FOR SECURING A BODY TO ANOTHER BODY
4 Claims, 3 Drawing Figs.

[52] U.S. Cl. .................................................. 287/20.3, 74/568 R
[51] Int. Cl. .......................................................... F16b 2/14
[50] Field of Search ............................................ 74/568, 568 T, 568 M, 567, 821, 816, 89.15, 89; 77/4 P; 287/20.3

[56] References Cited
UNITED STATES PATENTS

| 2,719,740 | 10/1955 | Starr | 287/20.3 |
|---|---|---|---|
| 1,929,993 | 10/1933 | Russell | 74/568 X |
| 2,996,935 | 8/1961 | Williams | 74/816 |
| 3,072,836 | 1/1963 | Eisengrein | 74/821 X |

Primary Examiner—William F. O'Dea
Assistant Examiner—F. D. Shoemaker
Attorney—Werner W. Kleeman ABSTRACT: A device for securing one body to another body, for example a switch cam to a cam drum which has a groove for the reception of the first-mentioned body which may be clamped to the sidewalls of the groove under the action of a screw. According to the invention, the first-mentioned body has a holding part adapted to be located on one rim of the groove, this holding part projecting laterally and partially bridging the groove, and further has a wedge-shaped part projecting into the groove on one side thereof. This wedge-shaped part cooperates with a clamping piece threadably tightened by means of a screw designed as a head screw. The clamping piece is arranged adjacent the wedge-shaped part in the groove to tension the first-mentioned body in the groove, and the screw is supported on the holding part through which it passes and is freely displaceable axially relative thereto.

PATENTED JAN 11 1972  3,633,949
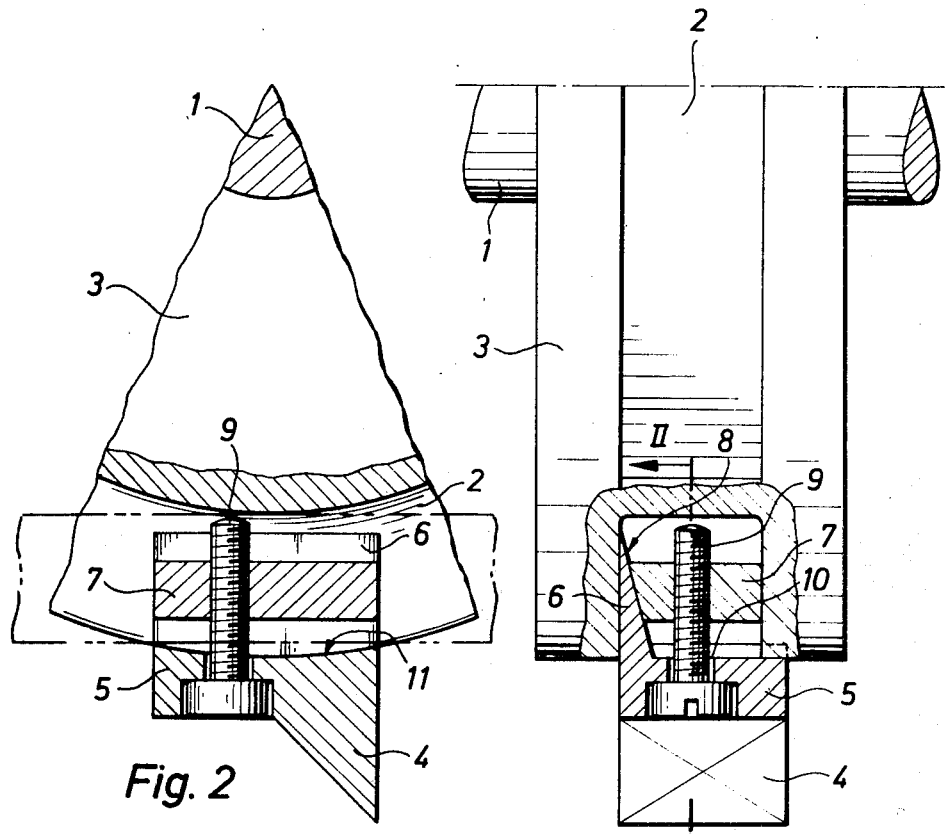
Fig. 2
Fig. 1
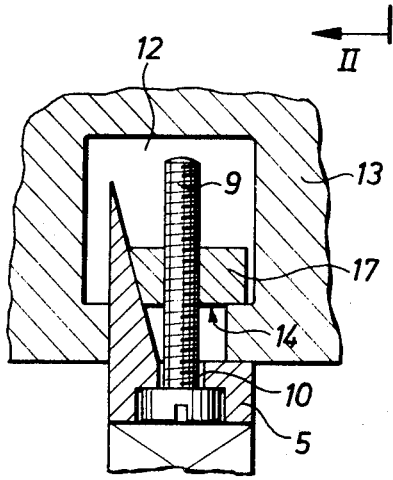
Fig. 3
HELMUT PFLÜGER, INVENTOR.
BY Jacobi, Davidson
& Kleeman
ATTORNEYS

DEVICE FOR SECURING A BODY TO ANOTHER BODY

The present invention concerns a new and improved device for securing a body, particularly a switch cam, to another body, particularly a cam drum, which has a groove for the reception of the body which can be secured to the sidewalls of the groove by the action of a screw.

A body of trapezoidal configuration in cross section at its securing part is known to the art and which is braced or clamped in a dovetailed groove. The trapezoidal fixing part can only be inserted at a given position, and specifically with a straight groove at the ends thereof and with an annular groove at a widened part, which is at least as wide as the widest part of the trapezoid part of the member, and not over the whole groove. The production is very expensive and the constructional shape requires an insertion aperture which drops out as the tensioning zone.

The object of the invention is to enable a body to be secured to another body wherein the one body can be inserted at any position in a groove of the other body and can be applied to the sidewalls of the groove by means of wide clamping faces while overcoming a large amount of play. This object is achieved according to the invention in that the one body has a holding part adapted to be located on one rim of a groove, of another body, projecting laterally and partially bridging the groove and a wedge-shaped part projecting into the groove on one side thereof, which cooperates with a clamping piece screwed up or tightened by means of a screw designed as a head screw, said clamping piece being arranged in the groove adjacent the wedge-shaped part to tension the first-mentioned body in the groove, and in that the screw is supported on the holding part through which it passes and is freely displaceable axially relative thereto. The device according to the invention may be inserted at any position of a groove having parallel or even slightly outwardly inclined walls and also in one undercut within limits and can be firmly clamped even when a large amount of play has to be overcome. It consists of few parts which are inexpensive to produce and having large tolerances and is simple to handle. The applied surfaces are relatively wide so that high pressure and damage to the wall of the groove does not take place even on numerous insertions and removal of a body in and out of the groove and satisfactory clamping is obtained. Great forces can be transmitted from the receiving body to the applied body or vice versa by means of the device.

In a further development of the invention the holding part is connected integrally on its side remote from the seat on the rim of the groove to the wedge-shaped part projecting into the groove and the screw is arranged staggered towards the part of the holding part placed on the rim of the groove and to the side of the tensioning member resting on the wall of the groove. The applied body has a favorable L-shaped form with small outer faces without any projection on the outer side of the wedge-shaped part by means of which projection the applied body could be placed on the rim of the groove, which lies nearest to the screw.

If the head screw passes through the holding part with such radial play, at least in a direction across the groove, that the tensioning member, at its widest part, is displaced across the groove on screwing up the screw, then the applied body and the tensioning member may be used in a groove which is undercut within limits. The tensioning member may be moved transversely for insertion in the groove and thereby may be adjusted narrower corresponding to the outer part of the groove that in the undercut part of the groove, the outer face of the wedge part being flat. In this way a radial or axial tensioning may be obtained according to the design of the parts.

A device for securing a body designed as a switch cam onto a cam drum is shown schematically in the drawing as an embodiment, by way of example only, of the subject matter of the invention and in which:

FIG. 1 is a view of one-half of a cam drum having an annular groove;

FIG. 2 shows a part side elevation and part section taken along line II—II in FIG. 1; and FIG. 3 shows the use of the device in another type of receiving body.

Describing now the drawing, in FIGS. 1 and 2 a cam drum 3 having an annular groove 2 is fixedly mounted on a shaft 1. A switch cam 4 is mounted on this cam drum 3 and adapted to be adjusted along the annular groove 2. For this purpose the cam 4 has a holding part 5 located outside the annular groove 2, partly bridging this and resting in FIG. 1 with its right-hand shoulder on the rim of the annular groove and having on the side remote from the support side, a wedge-shaped part 6, projecting into the annular groove 2, which rests with its outer side on the left-hand sidewall of the annular groove 2. A clamping piece 7 is disposed in the annular groove 2 and rests with its right-hand side on the right-hand sidewall of the annular groove 2 and rests on its left-hand side by means of its wedge-shaped surface on a corresponding wedge-shaped face 8 of the wedge-shaped part 6.

The clamping piece 7 has a thread in which a head screw 9 is screwed. The head of this screw is received with lateral play in a cutout or recess in the holding part 5 and passes through the holding part 5 with large lateral play as indicated at 10 at least in the transverse direction of the annular groove 2. The head screw 9 is preferably located nearer to the right-hand sidewall of the annular groove 2 than the left-hand sidewall thereof.

The device may be utilized both in a curved annular groove (FIG. 2, full line outline) and in a straight longitudinal groove (shown as a phantom line outline in FIG. 2). In both cases the shoulder resting on the receiving body may be flat. It is however also possible to curve this shoulder, as shown at 11 in FIG. 2, to correspond to the receiving body or cam drum. This shoulder preferably has two lateral support projections, the curved recess or cutout lying therebetween forming an interval between the shoulder and the rim of the groove. The device may, as shown in FIG. 3 also be used with an undercut groove 12, if the play 10 between the head screw 9 and the holding part 5 is so great that the clamping member 17, designed at its widest part substantially narrower than the groove receiving it, is displaceable transversely with respect upon tightening to the groove the screw 9. In this case the clamping member 17 may not exceed the width of the outermost parts of the groove 12 so that it may be inserted into the latter and removed therefrom.

Such a design is particularly useful if the forces exerted laterally on the screw 9, for example with an arched groove are taken up by the cam drum 3 and/or if the left-hand side of the groove shown in the drawing is without an undercut.

While with an annular groove 2 as shown in FIG. 1 a positive connection between the switch cam 4 and the cam drum 3 is present, with the annular groove 12 a form-locking connection in the radial direction results. In this case it is convenient to design the side 14 of the clamping member 17 adjacent the holding member, arched to correspond to the annular groove and/or provide it with lateral projections. By suitable matching of the undercut part of the annular groove 12 and the device for securing the switch cam to the cam drum a form-locking connection may also be obtained.

The device according to the invention may be inserted at any position of the annular groove 2 or 12 and rests with a wide contact surface on at least one sidewall of the groove. During use of the device a large play can be overcome so that during production of the parts thereof and the annular groove associated therewith no narrow tolerances have to be adhered to. Due to the possibility of providing large contact surfaces between the device and the walls of the annular groove, no damage or wear to these walls takes place even with frequent changing of the switch cams.

If the parts mutually tensioned by tightening the screw do not release by themselves, when required, under wedge action, the release may take place by a slight tap on the head screw 9. The projections disposed laterally on the shoulder 11 permit exact application both on a flat and on differently curved positions of the rim of a straight or curved groove. The switch cam 4 and the clamping piece 7 or 17, due to use being possible with large tolerances, may be produced as cast parts not requiring a final finish. The fact that less force is required to clamp the switch cam securely, prevents damage to the head screw and to the mutual clamping parts.

The holding part may have, on its side resting on the shoulder of the annular groove, an extension engaging therein so that its lateral displacement is only possible within production tolerances. The screw also may be inserted in the holding part with play which only allows its axial displacement. The widest part of the clamping piece may correspond substantially to the width of the groove receiving it and mutual contact between the wedge part and the clamping piece may only be possible over about half of the wedge face so that the clamping piece, when in position is located deeper into the groove than the wedge part. Such a construction is however usable in narrower limits than the embodiment described.

While there is shown and described present preferred embodiments of the invention, it is to be distinctly understood that the invention is not limited thereto but may be otherwise variously embodied and practiced within the scope of the following claims.

I claim:

1. A device for securing a first body to a second body, comprising in combination:
   a. a first body;
   b. a second body provided with groove means having first and second opposed inner walls for receiving said first body;
   c. a clamping member disposed in said groove means;
   d. a screw-tightening means received by said clamping member and extending with play through said first body and freely displaceable therein;
   e. said groove means having an outer surface, said first body bearing against and bridging said outer surface of said groove means;
   f. said first body possessing a substantially L-shaped cross-sectional configuration and including a first leg portion and a second substantially wedge-shaped in longitudinal cross section leg portion;
   g. said first leg portion bearing against said outer surface of said groove means;
   h. said second substantially wedge-shaped leg portion extending into said groove means and laterally bearing along the outside face against said first inner wall;
   i. said clamping member laterally bearing against said wedge-shaped leg portion and said second inner wall of said groove means;
   j. said second leg portion tapering along the inside face facing said first leg portion and said second inner wall; and
   k. said clamping member bearing against said inside tapered face, whereby pivoting of said second leg portion is prevented so as to maintain said bearing relationship between said outer surface and said first leg.

2. The device of claim 1, wherein said first and second leg portions are integral with one another.

3. The device as claimed in claim 1, wherein said first body defines a holding part having two lateral support projections on a shoulder portion thereof resting on said outer surface of said groove means and further possesses a cutout therebetween forming a space between said shoulder portion and the outer surface of said groove means.

4. A device for securing a first body to a second body, comprising in combination;
   a. a first body;
   b. a second body provided with groove means having inner walls for receiving said first body;
   c. a clamping member disposed in said groove means;
   d. a screw-tightening means received by said clamping member and extending with play through said first body and freely displaceable therein;
   e. said groove means having an outer surface, said first body bearing against and bridging said outer surface of said groove means;
   f. said first body possessing a substantially L-shaped cross-sectional configuration and including a first leg portion and a second substantially wedge-shaped leg portion;
   g. said first leg portion bearing against said outer surface of said groove means;
   h. said second substantially wedge-shaped leg portion extending into said groove means;
   i. said clamping member laterally bearing against said wedge-shaped leg portion and an inner wall of said groove means;
   j. said screw member comprising a head screw which piercingly extends through said first leg portion with radial play such that said clamping member which is constructed at its widest location to be considerably narrower than said groove means upon tightening said screw means can be displaced in a direction substantially transverse to said groove means.

* * * * *